US010223542B2

(12) United States Patent
Konik et al.

(10) Patent No.: US 10,223,542 B2
(45) Date of Patent: Mar. 5, 2019

(54) INTELLIGENT DATABASE WITH SECURE TABLES

(71) Applicant: International Business Machines Corporation, Armonk, NY (US)

(72) Inventors: Rafal P. Konik, Oronoco, MN (US); Roger A. Mittelstadt, Byron, MN (US); Brian R. Muras, Rochester, MN (US); Mark W. Theuer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 14/565,540

(22) Filed: Dec. 10, 2014

(65) Prior Publication Data

US 2016/0171235 A1 Jun. 16, 2016

(51) Int. Cl.
*G06F 17/30* (2006.01)
*G06F 21/62* (2013.01)

(52) U.S. Cl.
CPC ................................ *G06F 21/6227* (2013.01)

(58) Field of Classification Search
CPC .............. G06F 17/30867; G06Q 10/10; H04L 29/08936
USPC ....... 707/784, 698, 694, 661, 779, 713, 745, 707/718
See application file for complete search history.

(56) References Cited

U.S. PATENT DOCUMENTS 4,658,370 A 4/1987 Erman et al.
6,578,037 B1 * 6/2003 Wong ................ G06F 17/30471 707/694
6,816,853 B1 * 11/2004 Agarwal ........... G06F 17/30501 707/714
7,711,750 B1 * 5/2010 Dutta .................. G06F 21/6227 707/784
8,024,339 B2 * 9/2011 Barker ................ G06F 21/6227 707/736
8,032,765 B2 10/2011 Dettinger et al.
8,458,487 B1 6/2013 Palgon et al.
8,478,713 B2 7/2013 Cotner et al.
8,812,481 B2 * 8/2014 Zuzarte ............. G06F 17/30433 707/713
9,110,947 B1 8/2015 Watzke et al.
9,332,025 B1 * 5/2016 Watson ............... H04L 63/1441
9,369,433 B1 * 6/2016 Paul .................... H04L 63/0227

(Continued)

OTHER PUBLICATIONS

Rask et al.; "Implementing Row- and Cell-Level Security in Classified Databases Using SQL Server 2005", Apr. 1, 2005, Updated Sep. 1, 2005, retrieved Aug. 22, 2014, <http://technet.microsoft.com/en-us/library/cc966395>.

(Continued)

*Primary Examiner* — Jeffrey A Burke
*Assistant Examiner* — Thong Vu
(74) *Attorney, Agent, or Firm* — Patterson + Sheridan, LLP

(57) ABSTRACT

Systems, methods, and computer program products to perform an operation comprising upon determining that a received query requests values of sensitive data stored in a secure database table of a database, computing a security score for the received query based on a determined specificity of a selection predicate of the received query, and upon determining that the security score exceeds a security threshold, performing a predefined operation to restrict access to the requested values of the sensitive data.

16 Claims, 3 Drawing Sheets

(56) References Cited

U.S. PATENT DOCUMENTS

| | | | | |
|---|---|---|---|---|
| 9,547,824 | B2 * | 1/2017 | Indeck | G06N 5/025 |
| 2002/0156645 | A1 | 10/2002 | Hansen | |
| 2004/0098366 | A1 * | 5/2004 | Sinclair | G06F 21/6245 |
| 2006/0112090 | A1 * | 5/2006 | Amer-Yahia | G06F 17/3053 |
| 2006/0212429 | A1 * | 9/2006 | Bruno | G06F 17/30463 |
| 2007/0016563 | A1 * | 1/2007 | Omoigui | G06F 17/3061 |
| 2007/0136237 | A1 * | 6/2007 | Barker | G06F 21/6227 |
| 2007/0143827 | A1 * | 6/2007 | Nicodemus | G06F 21/6218 726/2 |
| 2008/0021899 | A1 * | 1/2008 | Avidan | G06K 9/6276 |
| 2009/0199273 | A1 * | 8/2009 | Yalamanchi | G06F 21/6227 726/4 |
| 2009/0287837 | A1 * | 11/2009 | Felsher | G06F 19/322 709/229 |
| 2010/0174693 | A1 * | 7/2010 | Chandrasekhara | G06F 17/30569 707/698 |
| 2011/0035403 | A1 | 2/2011 | Ismalon | |
| 2011/0314010 | A1 * | 12/2011 | Ganti | G06F 17/30395 707/728 |
| 2013/0298242 | A1 | 11/2013 | Kumar et al. | |
| 2013/0312107 | A1 * | 11/2013 | Agrawal | G06F 21/62 726/26 |
| 2014/0095442 | A1 * | 4/2014 | Guo | G06F 17/30073 707/661 |
| 2014/0095543 | A1 * | 4/2014 | Hsiao | G06F 17/30442 707/779 |
| 2014/0149387 | A1 * | 5/2014 | Konik | G06F 17/30442 707/713 |
| 2014/0379693 | A1 | 12/2014 | May et al. | |
| 2015/0363442 | A1 * | 12/2015 | Bestgen | G06F 17/30315 707/745 |
| 2016/0042009 | A1 * | 2/2016 | Gkoulalas-Divanis | G06F 17/30165 707/783 |
| 2017/0024433 | A1 * | 1/2017 | Neelakanthappa | G06F 17/30442 |

OTHER PUBLICATIONS

John Hawes; "Naked Security: 1.2 billion logins scooped up by CyberVor hacking crew—what you need to do", Aug. 6, 2014, pp. 1-7, retrieved Aug. 22, 2014, <http://nakedsecurity.sophos.com>.

Owasp; "SQL Injection Prevention Cheat Sheet", Last Revised Jun. 7, 2014, pp. 1-14, retrieved Aug. 22, 2014, <https://www.owasp.org/index.php?title=SQL_Injection_Prevention_Cheat_Sheet&oldid=176642>.

U.S. Appl. No. 14/567,508, entitled "Intelligent Database with Secure Tables", filed Dec. 11, 2014.

IBM "List of IBM Patents or Patent Applications Treated as Related".

* cited by examiner

INTELLIGENT DATABASE WITH SECURE TABLES

BACKGROUND

The present disclosure relates to databases, and more specifically, to intelligent databases with secure database tables.

Storing sensitive data such as social security numbers, credit cards, and login credentials in databases has led to malicious efforts to obtain the data. Often times, sensitive data is obtained by someone having the credentials of a legitimate user, or by someone leveraging legitimate interfaces to the database to inject malicious code that returns the sensitive data.

SUMMARY

Embodiments disclosed herein include systems, methods, and computer program products to perform an operation comprising upon determining that a received query requests values of sensitive data stored in a secure database table of a database, computing a security score for the received query based on a determined specificity of a selection predicate of the received query, and upon determining that the security score exceeds a security threshold, performing a predefined operation to restrict access to the requested values of the sensitive data.

DETAILED DESCRIPTION

Embodiments disclosed herein secure sensitive database data by limiting the information returned to users, regardless of whether a given user has authority to access the data. Generally, databases implementing the techniques disclosed herein only return sensitive data responsive to specific queries indicating some level of knowledge of the sensitive data. Stated differently, embodiments disclosed herein restrict databases from returning large amounts of sensitive data responsive to broad queries. For example, a database management system implementing the techniques described herein may not allow the return of information requested from a secure table named "Customer_Table" by the following broad query:

```
SELECT *
FROM Customer_Table
```

Generally, database management systems (DBMS) disclosed herein may analyze queries using different heuristics to determine whether the queries are designed to return large amounts of sensitive data. For example, and without limitation, the DBMS may analyze a source of the query (i.e., a command line interface versus a trusted application), access methods specified by the query, a number of rows returned by executing the query, a number of selection predicates in the query, whether selection predicates are meaningfully limiting of the result set, a cardinality of values in a column targeted by a selection predicate, and the like. In at least one embodiment, the DBMS may also compute a score for a query based on one or more heuristics. If the computed score for the query exceeds a security threshold, the DBMS may restrict execution of the query.

Figure 1:
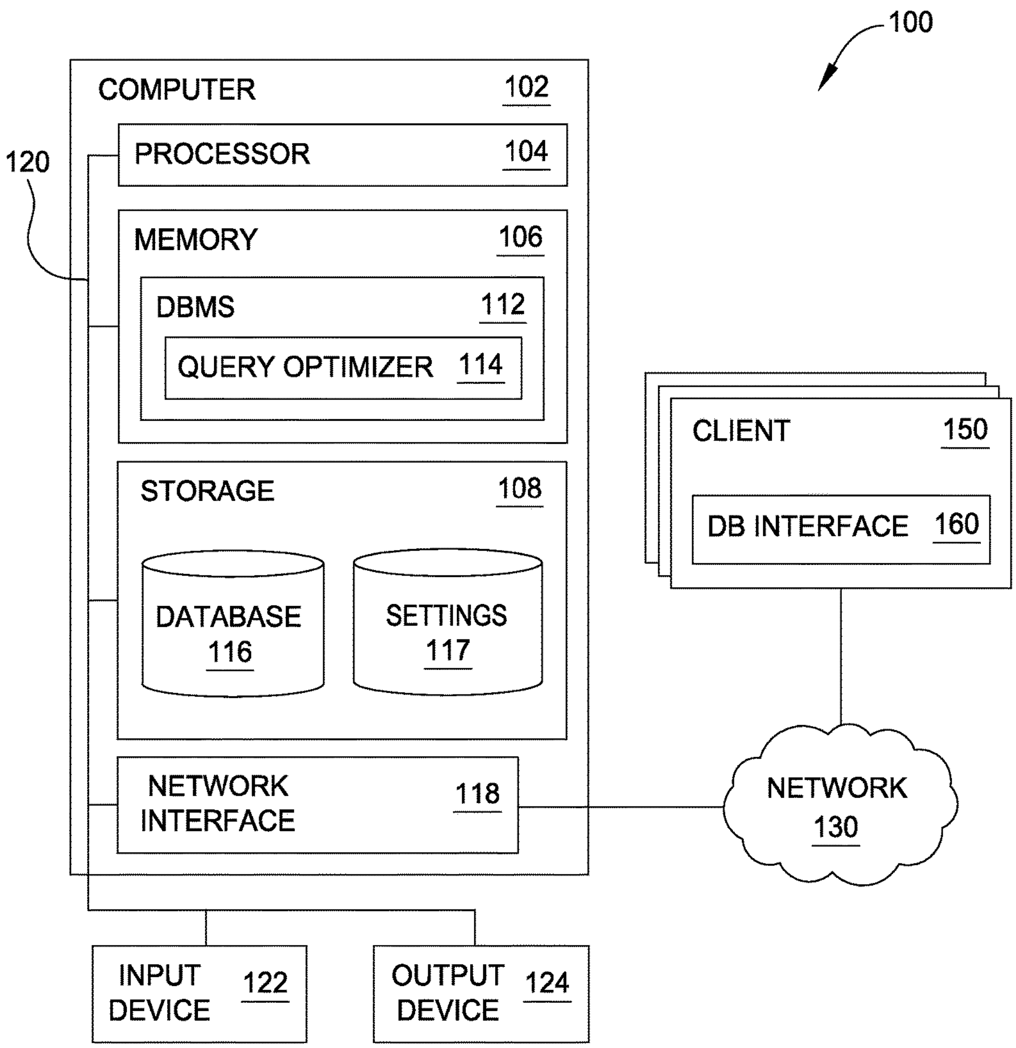
FIG. 1 illustrates a system which provides intelligent databases with secure tables, according to one embodiment.

FIG. 1 illustrates a system 100 which provides intelligent databases with secure tables, according to one embodiment. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 which obtains instructions and data via a bus 120 from a memory 106 and/or a storage 108. The computer 102 may also include one or more network interface devices 118, input devices 122, and output devices 124 connected to the bus 120. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is a programmable logic device that performs instruction, logic, and mathematical processing, and may be representative of one or more CPUs. The network interface device 118 may be any type of network communications device allowing the computer 102 to communicate with other computers via the network 130.

The storage 108 is representative of hard-disk drives, solid state drives, flash memory devices, optical media and the like. Generally, the storage 108 stores application programs and data for use by the computer 102. In addition, the memory 106 and the storage 108 may be considered to include memory physically located elsewhere; for example, on another computer coupled to the computer 102 via the bus 120.

The input device 122 may be any device for providing input to the computer 102. For example, a keyboard and/or a mouse may be used. The input device 122 represents a wide variety of input devices, including keyboards, mice, controllers, and so on. Furthermore, the input device 122 may include a set of buttons, switches or other physical device mechanisms for controlling the computer 102. The output device 124 may include output devices such as monitors, touch screen displays, and so on.

As shown, the memory 106 includes a database management system (DBMS) 112, which is an application configured to allow for the definition, creation, querying, updating, and administration of databases, such as the database 116. As shown, the DBMS 112 includes a query optimizer 114. The query optimizer 114 is an application generally configured to analyze queries received by the DBMS 112 and create a query execution plan for the query. The query optimizer 114 generally attempts to determine the most efficient way to execute a given query by considering the possible query plans. The query optimizer 114 is further configured to restrict queries that target sensitive data in the database 116, even if the query is issued by a user having authority to access the sensitive data. Generally, the query optimizer 114 may analyze different attributes of the queries in order to determine whether the query is legitimate, or is an overly broad query that attempts to extract the sensitive data. The query optimizer 114 may analyze any number or combination of attributes of the query, such as the source of the query (such as an ad hoc query from a command line interface or a known query from a trusted application), the number of rows that would be returned by executing the query, whether a database table column includes many different values or very few unique values, a location attribute of the computer generating the query, and the like. Generally, in analyzing the query, the query optimizer 114 determines whether the query is overly broad, or includes specific information limiting the breadth of results returned by executing the query. In at least one embodiment, the query optimizer 114 may compute a score for the query based on the analysis of the query. If the score exceeds a predefined security threshold applicable to the query, the query optimizer 114 may perform any number of predefined operations to restrict execution of the query. For example, the query optimizer 114 may require an administrator's approval before executing a query or request a special one-time password set by the administrator prior to executing the query. If the query optimizer 114 restricts execution of the query, the query optimizer 114 may optionally return an error code or simply not return data.

For example, the query optimizer 114 may receive the following query:

SELECT SSN
FROM Customer_Table
WHERE SSN LIKE '4%'

The query optimizer 114 may then analyze the query and determine that the query targets social security numbers (SSN) from the table Customer_Table (which may be defined as a secure table in the schema of the database 116). In addition, the query optimizer 114 would determine that the query is seeking a broad number of results by selecting all SSNs in the table. In at least one aspect, the query optimizer 114 may not return results for sensitive data where the number of results returned exceeds a specified number of rows (or a percentage of rows, and the like). The query optimizer 114 would also determine that the selection predicate of "WHERE SSN LIKE '4%'" is not limiting in any meaningful way, as the selection predicate seeks all social security numbers that begin with 4, as a wildcard % follows the 4. The query optimizer 114 may use this information to determine that the entity requesting the query does not know anything specific about the data in the table. Based on one or more of these observations, the query optimizer 114 may determine to restrict execution of the query.

As another example, the query optimizer 114 may receive the following query:

SELECT *
FROM Customer_Table
WHERE SSN='123-456-7890'

The query optimizer 114 may permit execution of this query for a number of different reasons. For example, the selection predicate providing a specific social security number that is in the Customer_Table indicates that the entity issuing the query has some specific knowledge about the data in the table. Furthermore, the number of results returned by this query are likely to be low, meaning the query will likely not violate any limits on the number of rows (or percentage of rows) returned by the query.

As shown, the storage 108 includes the database 116, which is generally a collection of data that is organized according to a schema. The schema of the database 116 may define one or more tables in the database 116 as "secure tables," namely tables that store sensitive information (such as medical data, credit card information, social security numbers, and the like). Doing so allows the query optimizer 114 to determine whether to analyze queries that target sensitive data in the secure tables, and restrict queries that may be malicious attempts to obtain the sensitive data. The storage 108 also includes the settings 117, which is a data store that holds configuration information used by the query optimizer 114 when analyzing queries that may target sensitive data in secure tables. For example, the settings 117 may include a plurality of different analysis rules (or heuristics) that the query optimizer 114 may leverage when analyzing a query to determine whether the query is legitimate. The rules in the settings 117 may apply to all queries, or a subset of queries. For example, more stringent threshold may be required for an unknown query received from an unknown application relative to a known query from a trusted application. In addition, the settings 117 may include a plurality of security thresholds that the query optimizer 114 may compare to scores computed for queries targeting secure tables. The different thresholds in the settings 117 may apply to different types of queries. For example, a lower security threshold may apply to query received from a secure, trusted location, while a higher security threshold may apply to a query received from an unknown location. In addition, the settings 117 may specify predefined operations that the query optimizer 114 (or DBMS 112) may perform upon determining that a query is maliciously targeting sensitive data, such as requiring administrator approval prior to executing the query, scrambling columns of secure tables that are returned to users (so that users may not search for actual column names), and the like.

As shown, a plurality of clients 150 may interact with the DBMS 112 (and the database 116) via a database (DB) interface 160. The DB interface 160 may be any interface used to access a database, such as an application that directly issues queries to the DBMS 112, an application that interacts with application program interfaces (APIs, not pictured) of the DBMS 112, command line interfaces, and the like. The DB interface 160 may also be used to supply values that are used to form queries. For example, the DB interface 160 may prompt a user to provide their user ID number in a text box. Legitimate users would type in their ID, which may be, for example, "12345." A resulting query could therefore be:

SELECT *
FROM MyTable
WHERE UserID='12345'

However, a malicious user may attempt an SQL injection attack by providing the following data in the text box: "12345 or 'A'='A'." The resulting query would be SELECT *
FROM MyTable
WHERE UserID='12345' or 'A'='A'

Such a query would return all rows in the table MyTable, as the 'A'='A' criteria would always be true. In such a case, the query optimizer 114 may restrict processing of this query.

Figure 2:
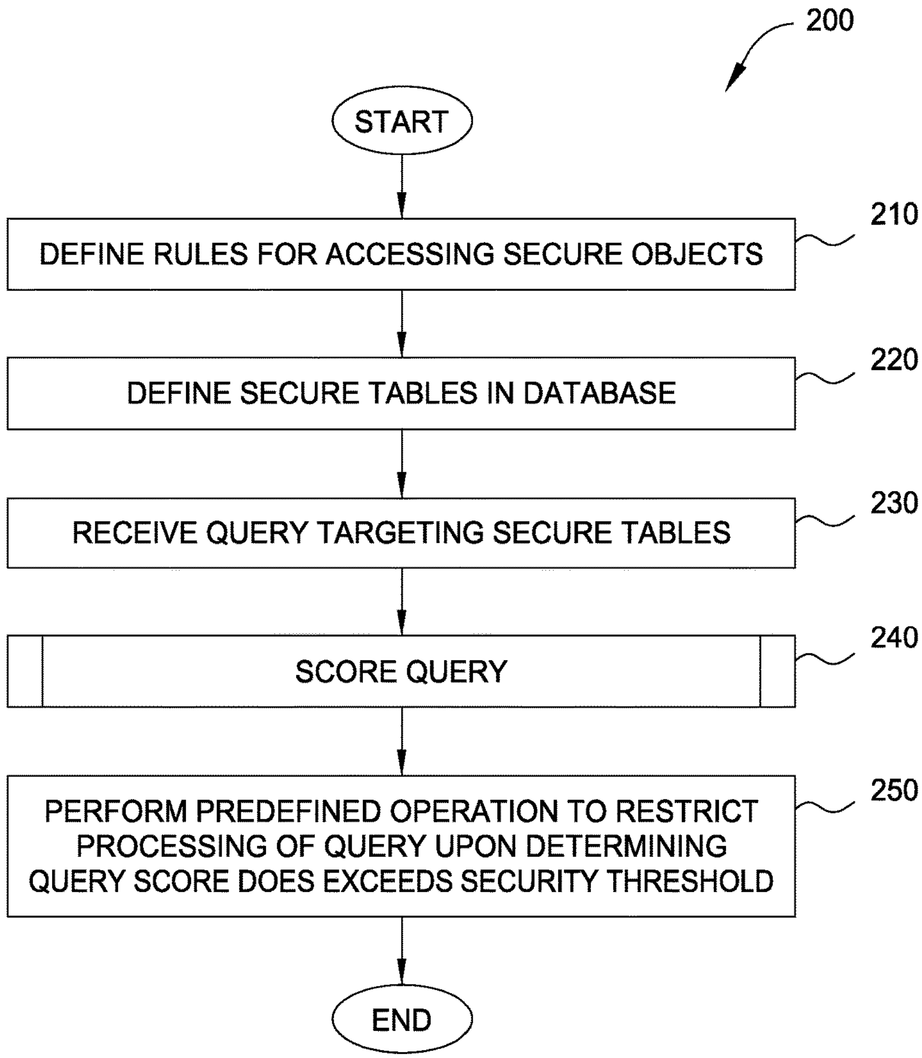
FIG. 2 illustrates a method to provide intelligent databases with secure tables, according to one embodiment.

FIG. 2 illustrates a method 200 to provide intelligent databases with secure tables, according to one embodiment. Generally, the steps of the method 200 provide additional security to sensitive database data by thwarting attempts to receive large amounts of sensitive data. In at least one embodiment, the query optimizer 114 may perform the steps of the method 200. The method 200 begins at step 210, where rules for accessing secure data objects in the database 116 are defined. Generally, the rules may be stored in the settings 117, and may include user-defined rules as well as default rules. For example, a first rule may disable "describe" commands that describe database tables and/or columns, as well as the files that store the database 116. Examples of such commands include "display file field description" and "display file description." As another example, a second rule may specify that the estimated number of rows returned by a query must be less than a threshold number of rows (such as 10 rows), or a threshold percentage of the table size (such as 0.05% of the table data). As another example, a third rule may specify that the query must contain unique (or specific) selection criteria on at least one table specified in the query. The rules may also include security thresholds that apply to scores for queries computed by the query optimizer 114. As still another example, a fourth rule may specify a condition requiring a where clause (or other selection predicate) specify a particular value for a field, such as a social security number, credit card number, and the like. In addition, the rules may specify any predefined actions the query optimizer 114 may perform when determining that a query is maliciously targeting sensitive data, such as requiring a special password, returning an error, and the like.

At step 220, a user may define one or more secure data objects in the database 116. For example, the user may specify that a customer table including social security numbers is a secure table. Similarly, tables including financial information, health information, or any other sensitive information may be marked as secure tables. Generally, any element of the database 116 may be defined as secure, such as tables, columns, materialized query tables (MQTs), user defined functions (UDFs), views, indexes, stored procedures, and the like.

At step 230, the query optimizer 114 may receive a query targeting secure tables in the database 116. At step 240, described in greater detail with reference to FIG. 3, the query optimizer 114 may score the query in order to determine whether the query should be executed. Generally, in scoring the query, the query optimizer 114 analyzes different attributes of the query, the source of the query, and the targeted data to ensure that the query is not a malicious attempt to obtain sensitive information. The query optimizer 114 may generally use any suitable algorithm for computing the score. For example, the query optimizer 114 may apply a weighted formula that considers the type of table access, the number of columns being selected, the number of duplicates in the column (i.e., the cardinality of values in the column), a size of the expected result set, and whether the query is an ad hoc query. In at least one embodiment, the score computed at step 240 may reflect a likelihood that the query is legitimate. At step 250, the query optimizer 114 may perform a predefined operation to restrict processing of the query upon determining that the score computed for the query at step 240 exceeds the relevant security threshold for the query. For example, the query optimizer 114 may restrict execution of the query, may require administrator approval to execute the query, and the like.

Figure 3:
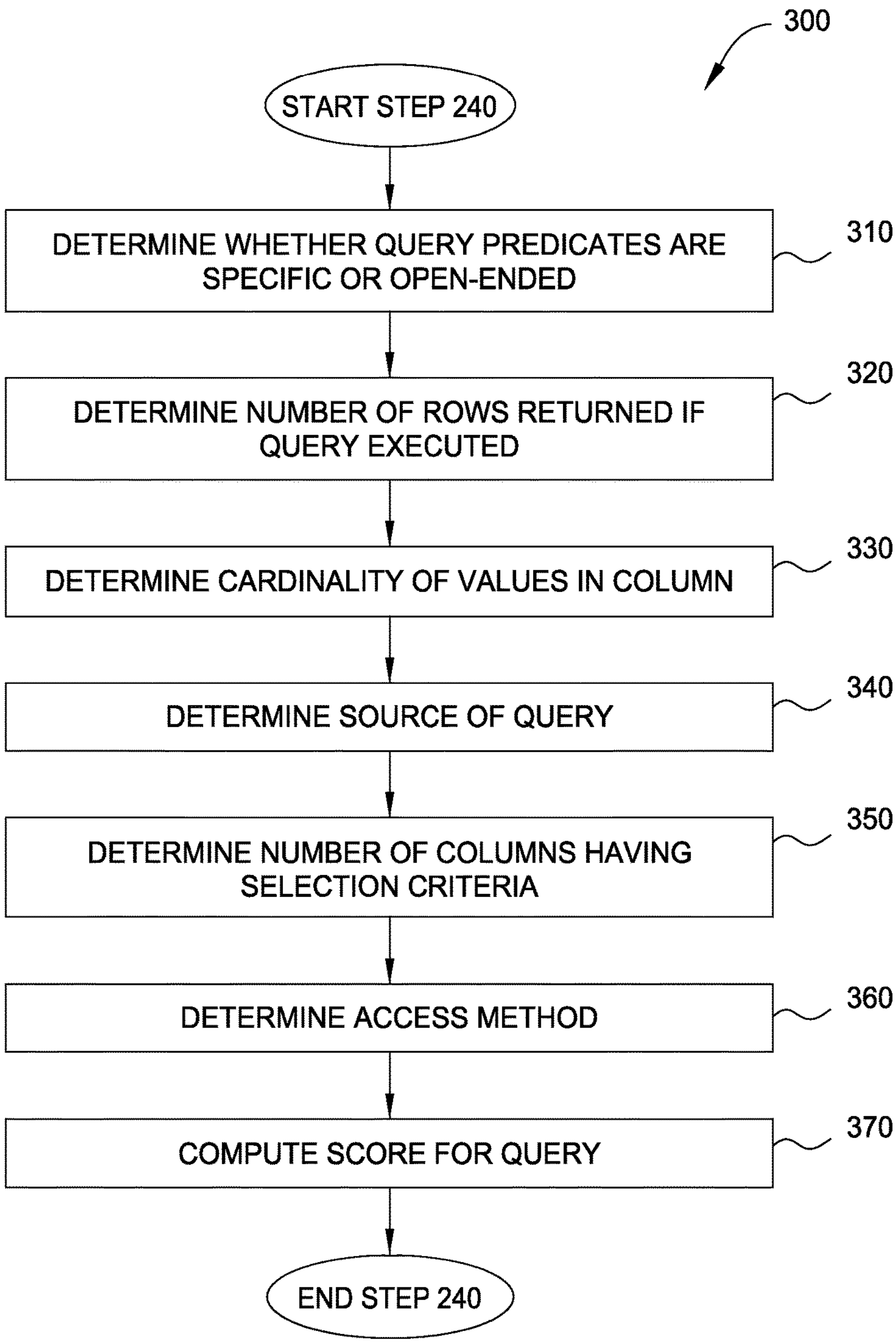
FIG. 3 illustrates a method to score a query, according to one embodiment.

FIG. 3 illustrates a method 300 corresponding to step 240 score a query, according to one embodiment. Generally, the query optimizer 114 may perform the steps of the method 300 to determine whether a query is maliciously attempting to obtain sensitive data. The specific steps listed in the method 300 should not be considered limiting of the disclosure, as the query optimizer 114 may perform any number and type of analyses in scoring a query. Furthermore, in at least one embodiment, the query optimizer 114 may not score a query at all, but leverage one or more elements of the analysis to make a definitive decision as to whether to restrict execution of a query targeting sensitive information. For example, if an unknown application attempts to obtain all credit card numbers in a secure table, the query optimizer 114 may block processing of the query without computing a score.

The method 300 begins at step 310, where the query optimizer 114 determines whether any predicates in the query are specific or open-ended. Open-ended predicates are more likely to be malicious, as they target large data sets, whereas specific predicates target less data and also show that the requesting entity knows something about the data in the database. For example, a query specifying a specific credit card number indicates knowledge of that credit card number, targets a limited subset of data, and is not likely to be malicious, while a query including a wildcard that returns all credit card numbers is overly broad, shows a lack of knowledge of the data in the table, and is more likely to be malicious. Therefore, if the query contains an open-ended predicate, the query optimizer 114 may compute a score for the query reflecting a higher likelihood that the query is not legitimate, and should be blocked. Similarly, if the query has a specific predicate, the query optimizer 114 may compute a score for the query reflecting a higher likelihood that the query is legitimate.

At step 320, the query optimizer 114 may determine the number of rows that would be returned if the query is executed. Similarly, the query optimizer 114 may determine what percentage of the rows in a table would be returned if the query is executed. If these values exceed a limit on the maximum number of rows (or percentage of rows) that can be returned, the query optimizer 114 may compute a score for the query reflecting a higher likelihood that the query is not legitimate. At step 330, the query optimizer 114 may determine the cardinality of values in a column of the secure table. The column may be the subject of a selection predicate in the query. If the cardinality of the values in the column is low, there are fewer unique values in the column, and the query optimizer 114 may compute a score for the query reflecting a higher likelihood that the query is legitimate. However, if the cardinality of the values in the column is high, the column is likely to hold a high number of unique values (such as credit card numbers, social security numbers, and the like). As such, a query requesting these values is less likely to be legitimate. In such cases, the query optimizer 114 may compute a score for the query reflecting a higher likelihood that the query is not legitimate.

At step 340, the query optimizer 114 may determine a source of the query. Generally, the source may refer to an application requesting the query, as well as a location of a system executing the application. The application may be any type of application. However, the query optimizer 114 may reference the settings 117 to retrieve information regarding the application, such as whether the application is known, trusted, or malicious, and whether the query was previously encountered by the query optimizer 114, and is known to be trusted or untrusted. Similarly, the settings 117 may specify trusted network addresses, locations, and the like. If the query optimizer 114 determines that the source of the query is trusted, the query optimizer 114 may compute a score for the query reflecting a higher likelihood that the query is legitimate, and therefore should be processed. If, however, the query optimizer 114 determines that the source of the query is not trusted (or is unknown), the query optimizer 114 may compute a score for the query reflecting a higher likelihood that the query is not legitimate. The query optimizer 114 may identify the source of the query by any number of methods, including analyzing a program stack from an application issuing the query, identifying a source IP address of a remote computer issuing the query, a signature of the program issuing the query, and the like.

At step 350, the query optimizer 114 may determine a number of columns in the secure table that the query specifies selection criteria for. In at least one embodiment the rules in the settings 117 may specify a minimum number of columns that the query must provide selection criteria for. For example, a rule in the settings may require that the query specify selection criteria for at least four columns in the secure table. If the query does not specify selection criteria for this number of columns, the query optimizer 114 may compute a score for the query reflecting a higher likelihood that the query is not legitimate. If, however, the query specifies selection criteria for four or more columns, the query optimizer 114 may compute a score reflecting a higher likelihood that the query is legitimate, as providing the selection criteria indicates some degree of knowledge or familiarity with the data in the secure data table.

At step 360, the query optimizer 114 may determine an access method the query uses to access the secure table. Examples of access methods include a table scan, indexing, or scan sharing. A table scan causes the entire table too be sequentially scanned. An index access method utilizes an index value specified in the query to probe the table to locate specific rows including the provided index value (such as: WHERE UserID='1234'). Scan sharing uses the buffer pool pages of another scan. The query optimizer 114 may view the index access method as providing specific information, which reflects some knowledge of the data in the database, and therefore a greater likelihood that the query is legitimate. On the other hand, table scans and scan sharing reflects a lack of knowledge of the data in the table. Therefore, if the access method is an index access method, the query optimizer 114 may compute a score for the query reflecting a greater likelihood that the query is legitimate. Furthermore, if the access method is scan or scan sharing, the query optimizer 114 may compute a score for the query reflecting a greater likelihood that the query is not legitimate.

At step 370, the query optimizer 114 may compute a score for the query based on one or more of the determinations made at steps 310-360. For example, the query optimizer 114 may compute the score based on the table access method, the number of columns the query is selecting, the number of duplicate values in the columns, whether the query source is recognized/trusted, and the result set size. The query optimizer 114 may generate any range of scores, such as 0 to 100 for a given query, where a greater value indicates a higher likelihood that the query is not legitimate. In such cases, if the query optimizer 114 generates a score of 87 for the query, the query optimizer 114 may then determine whether this score exceeds the applicable security threshold. If the security threshold is 80, then the query optimizer 114 may perform a predefined operation to restrict execution of the query. If, however, the security threshold is 90, the query optimizer 114 may process the query and return the results.

Advantageously, embodiments disclosed herein provide additional security to sensitive information stored in secure database tables. Specifically, embodiments disclosed herein analyze queries to determine whether the queries are malicious attempts to return sensitive data, even if the query is executed using an account which has access to the data. If the query reflects knowledge of the data in the database (by including specific data in the query, such as 'WHERE UserName="Frank FirstName"), then the query is more likely to be legitimate. If, however, the query reflects no knowledge of the underlying data, or reflects an attempt to return large amounts of data using non-limiting query language, embodiments disclosed herein may restrict execution of the query.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Reference is made herein to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the query optimizer 114 could execute on a computing system in the cloud and analyze received queries. In such a case, the query optimizer 114 could identify queries targeting sensitive and store an indication of the queries at a storage location in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A system, comprising:

one or more computer processors; and a memory containing a program which when executed by the one or more processors performs an operation comprising:

upon determining that a received query requests values of sensitive data stored in a secure database table of a database:

determining a specificity of a selection predicate in the received query based at least in part on whether the selection predicate specifies a known value stored in the secured database table;

computing a security score for the received query based on the determined specificity of a selection predicate of the received query; and upon determining that the security score exceeds a first security threshold value of a plurality of security threshold values, wherein the first security threshold value is based on the selection predicate having a first threshold level of specificity upon determining that the selection predicate specifies the known value, performing a first predefined operation to restrict access to the requested values of the sensitive data; and upon determining that the security score exceeds a second security threshold value of the plurality of security thresholds, wherein the second security threshold value is based on the selection predicate having a second threshold level of specificity greater than the first threshold level of security, performing a second predefined operation to permit access to the requested values of the sensitive data.

2. The system of claim 1, wherein the security score is further computed based on and a number of rows in a result set returned by executing the query against the secure database table, wherein the first predefined operation comprises one of: not executing the received query, executing the received query upon receiving approval from a database administrator to execute the received query, executing the received query and obscuring the requested values such that the requested values are not displayed, and requesting an additional password prior to executing the query.

3. The system of claim 1, wherein the security score is further based on: a source of the received query, a number of columns of the secure database table the received query requests values for, an access method of the received query, a count of selection predicates in the received query specifying known values, and a cardinality of a set of values stored in a column specified in the selection predicate of the received query.

4. The system of claim 1, wherein a property of the secured database table specifies that the database table is a secure database table, wherein the received query is submitted using a set of credentials corresponding to a valid account in a database management system managing the database.

5. The system of claim 1, wherein the received query further requests identification information of the secure database table, wherein the first predefined operation restricts access to the requested identification information of the secure database table.

6. The system of claim 1, wherein the selection predicate is determined to have a threshold level of specificity upon determining that the selection predicate specifies the known value.

7. The system of claim 1, wherein determining the specificity of the selection predicate of the received query comprises determining that processing the received query returns a number of rows from the secure database table that exceeds a threshold number of rows.

8. The system of claim 7, wherein the security score is computed based on a plurality of attributes of the received query, wherein a first attribute of the plurality of attributes comprises the number of rows returned exceeding the threshold number of rows.

9. The system of claim 8, wherein a second attribute of the plurality of attributes comprises the selection predicate of the received query being evaluated as true in all instances.

10. The system of claim 9, wherein a third attribute of the plurality of attributes comprises the selection predicate of the received query containing an open-ended predicate.

11. The system of claim 10, wherein the plurality of attributes further comprise: a source of the received query, a number of columns of the secure database table the received query requests values for, an access method of the received query, a count of selection predicates in the received query specifying known values stored in a column of the secure database table specified in the selection predicate of the received query, and a cardinality of a set of values stored in the column of the secure database table specified in the selection predicate of the received query.

12. A computer program product, comprising:

a computer-readable storage medium having computer-readable program code embodied therewith, the computer-readable program code executable by one or more computer processors to:

upon determining that a received query requests values of sensitive data stored in a secure database table of a database:

determining a specificity of a selection predicate in the received query based at least in part on whether the selection predicate specifies a known value stored in the secured database table;

computing a security score for the received query based on the determined specificity of a selection predicate of the received query; and upon determining that the security score exceeds a first security threshold value of a plurality of security threshold values, wherein the first security threshold value is based on the selection predicate having a first threshold level of specificity upon determining that the selection predicate specifies the known value, performing a first predefined operation to restrict access to the requested values of the sensitive data; and upon determining that the security score exceeds a second security threshold value of the plurality of security thresholds, wherein the second security threshold value is based on the selection predicate having a second threshold level of specificity greater than the first threshold level of security, performing a second predefined operation to permit access to the requested values of the sensitive data.

13. The computer program product of claim 12, wherein the security score is further computed based on and a number of rows in a result set returned by executing the query against the secure database table, wherein the first predefined operation comprises one of: not executing the received query, executing the received query upon receiving approval from a database administrator to execute the received query, executing the received query and obscuring the requested values such that the requested values are not displayed, and requesting an additional password prior to executing the query.

14. The computer program product of claim 12, wherein the security score is further based on: a source of the received query, a number of columns of the secure database table the received query requests values for, an access method of the received query, a count of selection predicates in the received query specifying known values, and a cardinality of a set of values stored in a column specified in the selection predicate of the received query.

15. The computer program product of claim 12, wherein a property of the secured database table specifies that the database table is a secure database table, wherein the received query is submitted using a set of credentials corresponding to a valid account in a database management system managing the database.

16. The computer program product of claim 12, wherein the received query further requests identification information of the secure database table, wherein the first predefined operation restricts access to the requested identification information of the secure database table.

* * * * *